(12) United States Patent
Lin

(10) Patent No.: US 8,863,650 B2
(45) Date of Patent: Oct. 21, 2014

(54) INFUSION PRESS LID ASSEMBLY

(76) Inventor: Shin-Shuoh Lin, Laguna Hills, CA (US)

( * ) Notice: Subject to any disclaimer, the term of this patent is extended or adjusted under 35 U.S.C. 154(b) by 661 days.

(21) Appl. No.: 13/135,935

(22) Filed: Jul. 20, 2011

(65) Prior Publication Data

US 2012/0097042 A1    Apr. 26, 2012

(30) Foreign Application Priority Data

Oct. 25, 2010    (CN) .......................... 2010 2 05759612

(51) Int. Cl.
*A47J 31/18*    (2006.01)
*A47J 31/20*    (2006.01)

(52) U.S. Cl.
CPC ....................................... *A47J 31/20* (2013.01)
USPC ............. 99/297; 99/287; 220/715; 220/254.3

(58) Field of Classification Search
CPC .............................. A47J 31/20; A47G 19/2272
USPC ............... 99/297, 287; 220/254.3, 254.2, 715
See application file for complete search history.

(56) References Cited

U.S. PATENT DOCUMENTS

| | | | |
|---|---|---|---|
| 5,478,586 A | 12/1995 | Connor | |
| 5,979,299 A | 11/1999 | Hornsby et al. | |
| 6,324,966 B1 | 12/2001 | Joergensen | |
| 6,422,133 B1 | 7/2002 | Brady | |
| 7,213,507 B2 | 5/2007 | Glucksman et al. | |
| D566,454 S | 4/2008 | Bodum | |
| D573,396 S | 7/2008 | Gauss | |
| D594,267 S | 6/2009 | Bodum | |
| 7,578,231 B2 | 8/2009 | Liu | |
| 2011/0088561 A1* | 4/2011 | Bodum | ........................... 99/297 |

FOREIGN PATENT DOCUMENTS

WO    WO 2009149568 A2 *  12/2009

* cited by examiner

*Primary Examiner* — Jianying Atkisson
(74) *Attorney, Agent, or Firm* — Gordon K. Anderson

(57) ABSTRACT

An infusion press lid assembly is taught consisting of a lid body having a configuration capable of attaching to a straight walled beverage containing vessel. An actuator lever (44) pivotally engages a lid body (20) with a pouring valve (56) embraced by the actuator lever. A plunger rod (70) is disposed within the lid body and a plunger knob (76) is attached to the plunger rod for manually pushing the rod away from the lid body. A piston (82) is attached to the plunger rod, with the piston having bottom screen (84); a hub (86), an outer ring (88) and a number of reinforcing spokes (90). A seal retainer (92) is disposed within a groove (94) around the piston's periphery and a lip seal (96) is positioned within seal retainer. When an infusible media is placed within a beverage containing vessel and hot water is poured over the media and the lid body is attached, after steeping a brewed beverage is formed. The piston is depressed passing through the beverage which includes media residual debris that is captured by the screen under the piston, when completely depressed the pouring valve may be released allowing the purified beverage to be sipped or poured from the container.

15 Claims, 3 Drawing Sheets

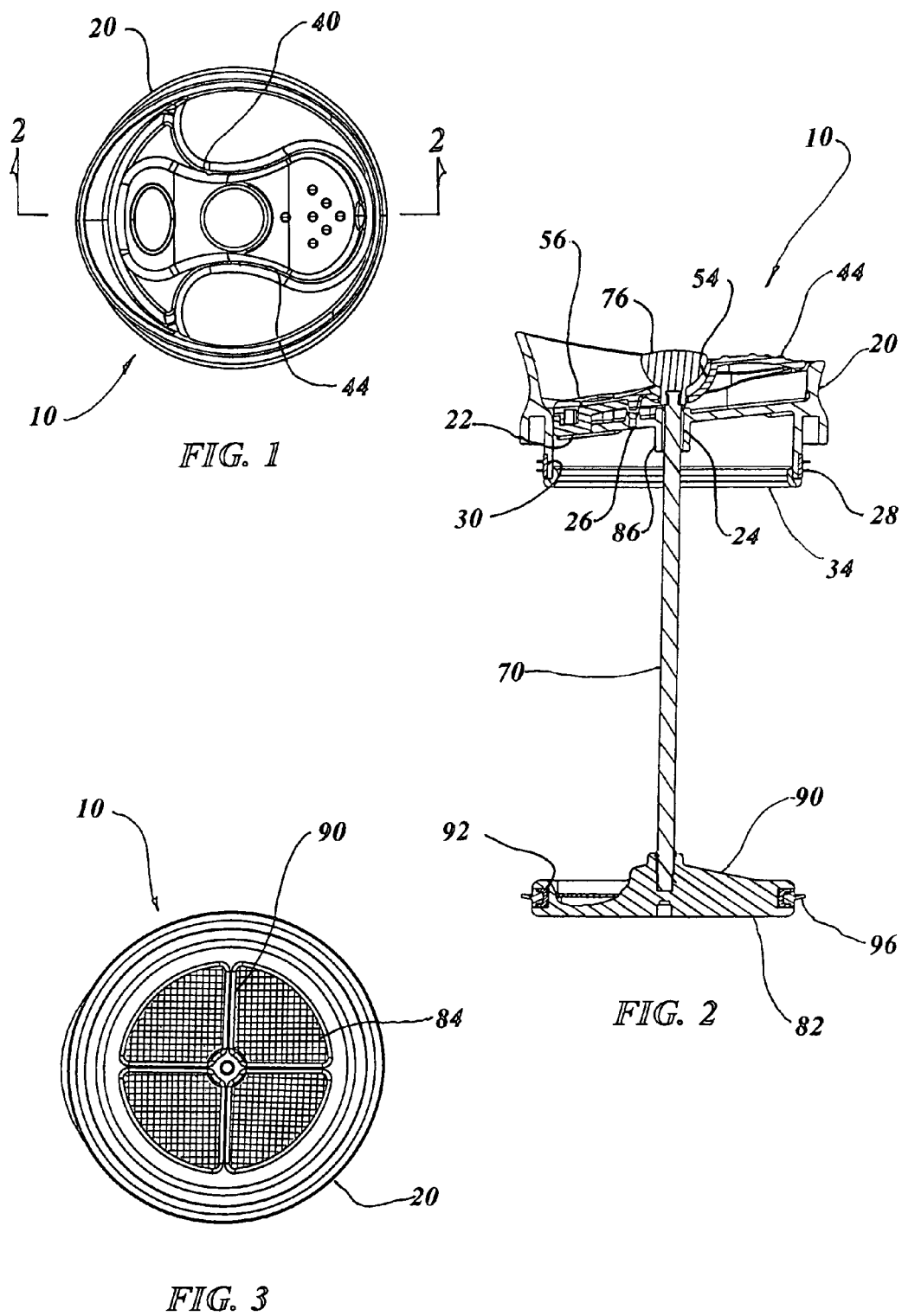

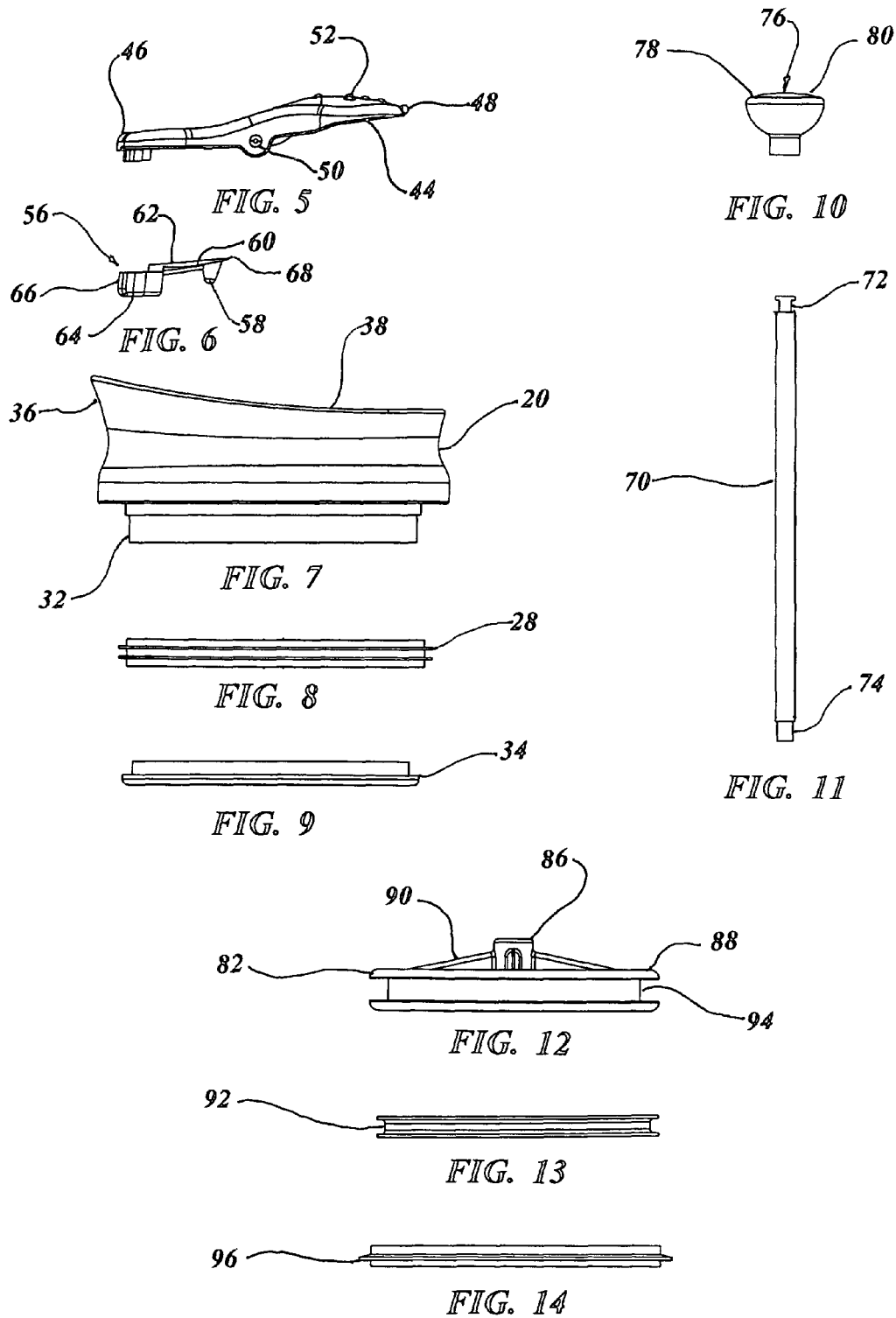

INFUSION PRESS LID ASSEMBLY

TECHNICAL FIELD

The present invention relates to infusion or, so called, French press beverage makers in general. More specifically to a lid for an infusion press which includes a piston configured to be used with a straight walled beverage container.

BACKGROUND ART

Previously, many types of presses have been used in endeavoring to provide an effective means to compress a beverage media, such as coffee grounds or tea leaves to obtain an enhanced flavor and strain the residual fines from the brewed beverage.

The prior art listed below did not disclose patents that possess any of the novelty of the instant invention; however the following U.S. patents are considered related:

| Pat. No. | Inventor | Issue Date |
| --- | --- | --- |
| 5,478,586 | Conner | Dec. 26, 1995 |
| 5,979,299 | Hornsby et al. | Nov. 9, 1999 |
| 6,324,966 B1 | Joergensen | Dec. 4, 2001 |
| 6,422,133 B1 | Brady | Jul. 23, 2002 |
| 7,213,507 B2 | Glucksman et al. | May 8, 2007 |
| D556,454 S | Bodum | Apr. 15, 2008 |
| D573,369 S | Gauss | Jul. 22, 2008 |
| D594,267 S | Bodum | Jun. 16, 2009 |
| 7,578,231 B2 | Liu | Aug. 25, 2009 |

Conner in U.S. Pat. No. 5,478,586 teaches a container having a cap and a press slidably mounted therein. The press has a filter on one end and a handle on the other. A user places the press in the container and adds coffee grounds or tea leaves and hot water on top of the filter which are allowed to steep. The user pulls upward on the handle trapping the residue between the filter and the cap and removes the cap. The user then drinks the beverage from the container.

U.S. Pat. No. 5,979,299 issued to Hornsby et al. is for a plunger filter infusion device consisting of a container, a plunger having a resilient plunger head slidable with in the container, and an insert in the base of the container. Infusible material is placed in the insert and heated water is poured into the container with the plunge slid into the container until the plunger head engages the insert. The infusible material is thus confined by the plunger and may be removed allowing cleaning and disposal of the material.

Joergensen in U.S. Pat. No. 6,324,966 B1 discloses a piston-type coffee maker having a cylindrical container, a lid, and a piston with a rod and a handle, where the piston is made as a filter for the ground coffee. The device is for making a single cup of coffee and for keeping the temperature at a suitable level for drinking. The coffee maker is adapted to be manufactured at low cost. The walls, lid and bottom are made to be heat isolating. An upper rim of the container has a locking member cooperatively engaging a corresponding member on the lid.

Brady in U.S. Pat. No. 6,422,133 B1 teaches a steeping apparatus to impart a flavor of food material to the liquid to produce a flavored beverage. A plunger is movable within a container and includes a filter element permitting the flow of liquid when lowered inhibiting the passage of the solid food material. A movable buffer is situated above the plunger and when lowered the food material is decoupled from the beverage.

U.S. Pat. No. 7,213,507 B2 issued to Glucksman et al. is for plunger filter infusion system which includes a container and an infuser. The infuser is positioned in a liquid, such as hot water and has a chamber for containing infusible materials, such as tea leaves. A plunger includes a piston with a seal and flap valves. After a brewing time has elapsed, a user pushes an operator to move the piston past a perforated wall portion in the chamber. When the piston reaches a solid wall portion at the bottom of the chamber the flap valves open to allow liquid to escape. However, small apertures aligned with the flap valves prevent the passage or the infusible material. Consequently the material is isolated when the piston reaches the bottom of the chamber.

Liu in U.S. Pat. No. 7,578,231 B2 discloses a plunger device for use with a beverage press having a screen for filtering fines from an infused beverage. A flexible seal is provided that is compressible to function properly in different sized containers. The seal may be made of a material such a rubber or rubberized plastics and may have a width greater than its thickness. Various seal embodiments are disclosed along with brew control and multiple access openings.

For background purposes and as indicative of the art to which the invention is related reference may be made to the remaining cited U.S. design patents D556,454 S issued to Bodum, D573,369 S issued to Gauss and D594,267 S issued to Bodum.

DISCLOSURE OF THE INVENTION

Infusion or, so called, French press beverage makers have been in use since the late 19$^{th}$ century and are called by numerous names but have been popular throughout the world. Recently there has been considerable interest within this country in this field of endeavor. Basically coffee grounds or tea leaves are placed in a straight walled vessel together with hot water and after a few minutes steeping occurs forming a brewed beverage. A plunger is pressed through the beverage trapping the grounds or fines at the bottom of the vessel.

A primary object of the invention permits any straight walled vessel to be used, as the invention consists of simply a lid with a plunger containing a strainer. While the lid assembly is designed specifically for the Timolino Ltd. Presto Series VPJ Vacuum Coffee Press, the only limiting factor is the inside diameter and a flat top of the straight wall of a vessel. Lip seals are provided in the invention for both the lid and plunger piston and the length of the plunger rod may be easily varied to mate with the height of the vessel.

An important object of the invention permits the assembly to be completely disassembled for cleaning. There are only ten separate parts in the entire invention, half of which may remain attached during normal cleaning such as the seals and the plunger rod may require only the knob removed to slide it from the lid body. When deep cleaning is required all may be removed as the components are snapped into place and seals are sufficiently resilient for assembly or disassembly. No screws or fasteners are found in the entire invention.

Another object of the invention is that all of the parts are dishwasher safe as they are made of thermoplastic resin or synthetic elastomers. The plunger rod may be made of a thermoplastic resin or stainless steel either of which is acceptable to be used in an automatic dishwasher.

Still another object of the invention is the feature that permits the lid to remain closed regardless of the position of the plunger and is only opened when pouring the brewed beverage from the lip of the lid body by depressing the activating lever.

Yet another object of the invention is in the design of the plunger knob as it is comfortable to use since the plunger knob incorporates an ergonomic dome shape. When the plunger is completely compressed the knob is contained in a depression in the activating lever and does not protrude above the top surface of the lid.

A further object of the invention is the ease of use as the lid is easily removed by simply lifting upwards with the double lip seal fitting near the top of the vessel. With the lid removed the brewing media and hot water may be poured into the open top and stirred, if desired, and the lid replaced. The plunger remains erect until the proper steeping forming the brewed beverage is accomplished and at that point the piston is manually depressed with the vessel resting on a solid surface filtering out the residue leaving it at the bottom of the vessel. The brewed beverage may then be sipped from the front of the pouring spout by pressing on the actuating lever releasing the pouring valve allowing the fluid to flow. Alternatively the beverage may be poured into a cup for consumption with the flow directed in a controlled stream from the pouring spout. French pressed coffee left to stand for over 20 minutes with the residue still under the plunger piston could become bitter, however some consider this effect beneficial. At any rate when empty the plunger may be easily removed and cleaned.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a top view of the infusion press lid with plunger in the preferred embodiment.

FIG. 2 is a cross sectional view taken along lines 2-2 of FIG. 1 with one of the reinforcing spokes cut away to illustrate the bottom screen.

FIG. 3 is bottom view of the preferred embodiment.

FIG. 5 is a right side view of the actuating lever in the preferred embodiment.

FIG. 6 is a right side view of the pouring valve in the preferred embodiment.

FIG. 7 is a right side view of the lid body in the preferred embodiment.

FIG. 8 is a right side view of the lid double lip seal in the preferred embodiment.

FIG. 9 is a right side view of the lid resilient bottom rim in the preferred embodiment.

FIG. 10 is a right side view of the plunger knob in the preferred embodiment.

FIG. 11 is a right side view of the plunger rod in the preferred embodiment.

FIG. 12 is a right side view of the piston in the preferred embodiment.

FIG. 13 is a right side view of the piston seal retainer in the preferred embodiment.

FIG. 14 is a right side view of the piston lip seal in the preferred embodiment.

BEST MODE FOR CARRYING OUT THE INVENTION

Figure 4:
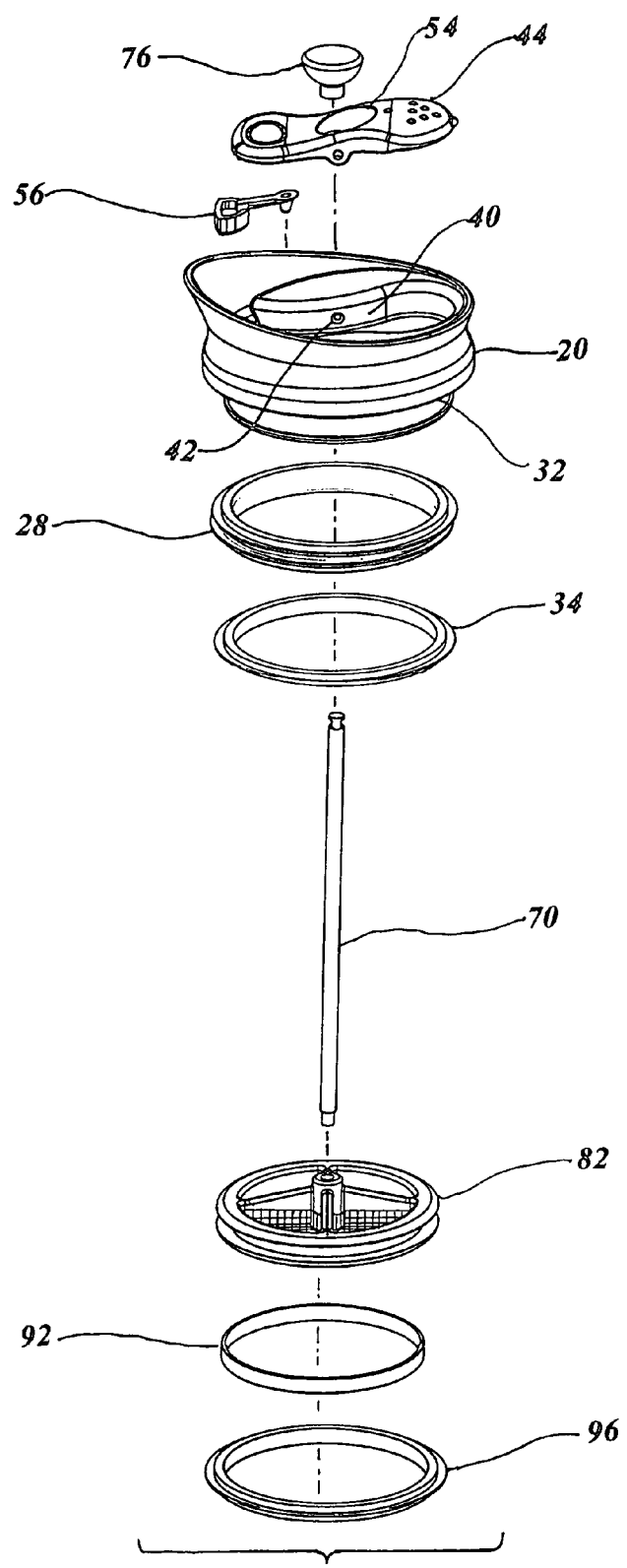
FIG. 4 is an exploded view of the preferred embodiment.

The best mode for carrying out the invention is presented in terms of a preferred embodiment of the infusion press lid assembly 10. This preferred embodiment of the lid assembly 10 is shown in FIGS. 1 thorough 14 and is comprised of a lid body 20 having a liquid pouring opening 22, a centered bore 24 and a valve pivot opening 26, with the lid body 20 having a configuration capable of attaching onto and penetrating a straight walled beverage containing vessel. A resilient double lip seal 28, depicted in FIGS. 4 and 8, is disposed on a recessed bottom portion 32 of the lid body 20. A resilient bottom rim covering 34, shown in FIGS. 4 and 9, is snapped over the lid body recessed bottom portion 32 forming a spaced seal groove 30 to retain the double lip seal 28, as illustrated in FIG. 2. A pouring spout 36 is formed within a top portion 38 of the lid body 20, permitting a beverage to be directed from the vessel into a controlled stream. A recess 40 within the top of the lid body 20 incorporates an opposed pair of protruding bosses 42 for interfacing with an activating lever 44, as illustrated in FIG. 4.

This activating lever 44, depicted in FIGS. 2, 4 and 5, pivotally engages the upper exterior of the top portion of the lid body 20. The actuator lever 44 consists of a counterweight end 46 and a lever operating end 48 along with a pair of opposed holes 50 positioned to mate with and snap into the protruding bosses 42 in the lid body 20. The actuating lever operating end 48 includes a non-slip surface 52 assuring gripping with a finger or thumb. The actuating lever 44 includes a dished shape knob receiving indentation 54, as depicted in FIG. 2, for clearance of other further described plunger components.

A pouring valve 56 includes a pivot point member 58 that is seated in the body valve pivot opening 26. The pouring valve 56 incorporates a valve body 60 with a valve top 62 and a valve bottom 64 with the bottom covering the liquid pouring opening 22 of the lid body 20 and the valve top 60 embraced by the actuator lever 44, as illustrated in FIG. 2. The pouring valve 56 is triangular in shape on a first end 66 and the pivot point member 58 is formed into an arm on a second end 68.

A plunger rod 70 has an upper end 72 and a lower end 74 and is slideably disposed within the centered bore 24 of the lid body 20, as illustrated in FIGS. 2, 4 and 11. The plunger rod 70 may be made of any acceptable material including thermoplastic however stainless steel is preferred.

A plunger knob 76 is attached to the upper end 72 of the plunger rod 76 for grasping and manually pushing the rod 76 downwardly away from the lid body 20. The plunger knob 76 also has a dome shaped top 80 forming a comfortable surface when pressing down on a piston within a beverage containing vessel. The plunger knob 76 snaps onto the upper end 72 of the plunger rod 70.

A piston 82 is pressed onto the lower end 74 of the plunger rod 70, with the piston 82 having a stainless steel bottom screen 84, a hub 86, an outer ring 88 and a plurality of reinforcing spokes 90 integrally formed between the hub 86 and the outer rim 88, shown pictorially in FIGS. 2, 3, 4 and 12. A resilient seal retainer 92 is disposed within a groove 94 around the piston's periphery securely grasping a resilient lip seal 96 within the U-shaped seal retainer 92. The stainless steel screen 84 is shown in FIGS. 2 and 3 with the screen 84 permanently fixed into a shelf of the piston outer ring 88 and reinforcing spokes 90.

When an infusible media is placed within the beverage containing vessel and hot water is poured over the media, the lid body 20 is then attached, after steeping a specific time a brewed beverage is formed. The piston is then depressed by the rod 70 pressing though the liquid beverage which still contains media residual debris, or so called fines, with the retained debris captured under the screen 84 within the piston 82, allowing only the filtered brewed beverage on top. When the actuating lever 44 is completely depressed the pouring valve 56 may be released allowing the purified beverage to be poured from the container and the lid and piston removed for cleaning.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

ADDENDUM

Element Designation

For Convenience of the Examiner, not Part of the Specification

10 infusion press lid assembly
20 lid body
22 liquid pouring opening (in 20)
24 centered bore (in 20)
26 valve pivot opening (in 20)
28 double lip seal (on 20)
30 spaced seal groove (for 28 on 20)
32 recessed bottom portion (of 20)
34 bottom rim (on 20)
36 pouring spout (on 38)
38 top portion (of 20)
40 recess (in top of 20)
42 protruding bosses (for interfacing with holes in 44)
44 activating lever
46 counter weight end (of 44)
48 operating end (of 44)
50 opposed holes (in 44 mating with 42)
52 non slip surface (of 48)
54 dished shape knob receiving indentation (in 44)
56 pouring valve
58 pivot point member (of 56)
60 valve body (of 56)
62 valve body top (of 56)
64 valve body bottom (of 56)
66 first end (of 56)
68 second end (of 56)
70 plunger rod
72 upper end (of 70)
74 lower end (of 70)
76 plunger knob
78 top surface (of 76)
80 dome shape (of 76)
82 piston
84 screen (within 82)
86 hub (of 82)
88 outer ring (of 82)
90 reinforcing spokes (of 82)
92 seal retainer (on 82)
94 groove (in 82 for 92)
96 lip seal (in 94)

The invention claimed is:

1. An infusion press lid assembly which comprises;
a lid body having a liquid pouring opening, a centered bore and a valve pivot opening, with the lid body further having a configuration capable of attaching onto and penetrating a straight walled beverage containing vessel, wherein said lid body further comprises a resilient double lip seal disposed within a groove in said lid body adjacent to a bottom portion,
an actuator lever pivotally engaging a top portion of the lid body, with the actuator lever having a counterweight end and a lever operating end,
a pouring valve having a pivot point member seated in the lid body having said body valve pivot opening to contain the pouring valve, the pouring valve defining a valve body with a top and a bottom, the bottom covering the liquid pouring opening and the top embraced by the actuator lever,
a plunger rod having an upper end and a lower end slideably disposed within the centered bore of the lid body,
a plunger knob attached to the upper end of the plunger rod for grasping and manually pushing the rod downwardly away from the lid body, and
a piston attached to the lower end of the plunger rod, with the piston having a screen, a hub, an outer ring, a resilient seal retainer disposed within a groove in said piston periphery, wherein said screen is stainless steel and permanently disposed within said piston between said hub and said outer rim, when an infusible media is placed within the beverage containing vessel and hot water is poured over the media and the lid body is attached, after steeping a brewed beverage is formed, the piston is depressed passing through the beverage which includes media residual debris that is captured under the piston, when completely depressed the pouring valve may be released allowing the purified beverage to be sipped or poured from the container.

2. The infusion press lid assembly as recited in claim 1 wherein said lid body further comprises a resilient bottom rim covering a lid body bottom portion.

3. The infusion press lid assembly as recited in claim 1 wherein said lid body further comprises a pouring spout on a top portion, permitting said beverage to be directed into a controlled stream.

4. The infusion press lid assembly as recited in claim 1 wherein said lid body further having a recess within a top portion with an opposed pair of protruding bosses for interfacing with said actuating lever.

5. The infusion press lid assembly as recited in claim 4 wherein said actuating lever having a pair of opposed holes positioned to mate with and snap into said protruding bosses in said lid body.

6. The infusion press lid assembly as recited in claim 1 wherein said actuating lever having dished shaped knob receiving indentation surface permitting said plunger knob to partially penetrate into said lid body.

7. The infusion press lid assembly as recited in claim 1 wherein said actuating lever operating end further comprises a non-slip surface assuring gripping with a finger or thumb.

8. The infusion press lid assembly as recited in claim 1 wherein said pouring valve further having a triangular shape on a first end and said pivot point member defining an arm on a second end.

9. The infusion press lid assembly as recited in claim 1 wherein said plunger rod is made of stainless steel.

10. The infusion press lid assembly as recited in claim 1 wherein said plunger knob further having a dome shaped top permitting a comfortable surface when pressing down on said piston within said beverage containing vessel.

11. The infusion press lid assembly as recited in claim 1 wherein said plunger knob snaps onto said upper end of said plunger rod.

12. The infusion press lid assembly as recited in claim 1 wherein said plunger rod is pressed into said lower end of said piston.

13. The infusion press lid assembly as recited in claim 1 wherein said piston further comprises a plurality of reinforcing spokes integrally formed between said hub and said outer rim.

14. The infusion press lid assembly as recited in claim 1 wherein said piston further comprising a resilient lip seal disposed within seal retainer around said piston periphery.

15. The infusion press lid assembly as recited in claim 1 wherein the lid body, the actuator lever, the pouring valve, the plunger knob and the piston are formed of thermoplastic resin selected from the group consisting of cellulose, phenolic, phenylene oxide, polycarbonate, polyester, polyethylene, polypropylene, polystyrene, acetyl, polyimide and poly vinyl chloride.

\* \* \* \* \*